(12) United States Patent
Togawa

(10) Patent No.: US 12,547,161 B2
(45) Date of Patent: Feb. 10, 2026

(54) PLANT CONTROL PROPOSAL SYSTEM, METHOD, AND RECORDING MEDIUM

(71) Applicant: NEC Corporation, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 443 days.

(21) Appl. No.: 18/021,313

(22) PCT Filed: Sep. 29, 2020

(86) PCT No.: PCT/JP2020/036771
§ 371 (c)(1),
(2) Date: Feb. 14, 2023

(87) PCT Pub. No.: WO2022/070231
PCT Pub. Date: Apr. 7, 2022

(65) Prior Publication Data
US 2023/0229150 A1   Jul. 20, 2023

(51) Int. Cl.
*G05B 19/418* (2006.01)
*G06Q 10/0639* (2023.01)

(52) U.S. Cl.
CPC . *G05B 19/41885* (2013.01); *G06Q 10/06393* (2013.01); *G05B 2219/37591* (2013.01)

(58) Field of Classification Search
CPC .... G05B 19/41885; G05B 2219/37591; G05B 13/04; G06Q 10/06393

(Continued)

(56) References Cited

U.S. PATENT DOCUMENTS

| 7,233,886 B2 * | 6/2007 | Wegerich | G05B 23/0254 |
| | | | 702/182 |
| 2007/0234781 A1 * | 10/2007 | Yamada | G05B 13/0265 |
| | | | 73/23.2 |

(Continued)

FOREIGN PATENT DOCUMENTS

| JP | H04-133164 A | 5/1992 |
| JP | H07-36535 A | 2/1995 |

(Continued)

OTHER PUBLICATIONS

JP Office Action for JP Application No. 2022-553241, mailed on Oct. 17, 2023 with English Translation.

(Continued)

*Primary Examiner* — Chun Cao
(74) *Attorney, Agent, or Firm* — Sughrue Mion, PLLC

(57) ABSTRACT

This plant control support system is provided with an acquisition unit, a generation unit, and an output unit, in order to provide a technique for appropriately supporting plant control without relying on the know-how and knowledge of experts and manuals. The acquisition unit acquires state information regarding the state of a plant. The generation unit uses a control model, and on the basis of the state information, generates control contents according to the state of the plant as proposed control contents. The control model is a model obtained by training the relationship between the control contents for controlling the plant and the control result obtained by executing the control of the control contents on the plant. The output unit outputs the proposed control contents.

11 Claims, 8 Drawing Sheets

(58) Field of Classification Search
USPC .......................................................... 700/29
See application file for complete search history.

(56) References Cited

U.S. PATENT DOCUMENTS

| | | | | |
|---|---|---|---|---|
| 2015/0160630 A1* | 6/2015 | Makishima | ........ | G05B 19/0425 |
| | | | | 700/12 |
| 2020/0109063 A1* | 4/2020 | Nakajima | ............... | C02F 1/686 |
| 2020/0218244 A1* | 7/2020 | Furuichi | ............ | G05B 13/0265 |

FOREIGN PATENT DOCUMENTS

| | | | |
|---|---|---|---|
| JP | H09-297524 A | | 11/1997 |
| JP | H11-39022 A | | 2/1999 |
| JP | 2004169341 A | * | 6/2004 |
| JP | 2007-264796 A | | 10/2007 |
| JP | 2014-052929 A | | 3/2014 |
| JP | 2018-180649 A | | 11/2018 |
| JP | 2019-219147 A | | 12/2019 |
| WO | 2019/159280 A1 | | 8/2019 |

OTHER PUBLICATIONS

International Search Report for PCT Application No. PCT/JP2020/036771, mailed on Nov. 24, 2020.
English translation of Written opinion for PCT Application No. PCT/JP2020/036771, mailed on Nov. 24, 2020.

* cited by examiner

PLANT CONTROL PROPOSAL SYSTEM, METHOD, AND RECORDING MEDIUM

This application is a National Stage Entry of PCT/JP2020/036771 filed on Sep. 29, 2020, the contents of all of which are incorporated herein by reference, in their entirety.

TECHNICAL FIELD

The present invention relates to a technique for supporting control of plants such as power plants and chemical plants.

BACKGROUND ART

There are various types of plants that are facilities in which a plurality of types of devices operate in cooperation, such as power plants, chemical plants, food plants, waste treatment plants, and water treatment plants. Power plants are facilities that generate electricity, and examples of the power plants include hydroelectric power plants, thermal power plants, and nuclear power plants. Chemical plants are plants that manufacture chemical products such as gasoline, chemical fibers, and pharmaceuticals. Food plants are plants that manufacture processed foods. Waste treatment plants are plants that treat wastes to perform recovery of recycled resources and power generation using incineration heat. Water treatment plants are plants that perform various types of treatment on water in order to make the water have a water quality in accordance with the purpose of use or to discharge the water having a water quality that does not affect the surrounding environment.

Methods of controlling the operation of such plants include control called process control including feedforward control and feedback control.

PTL 1 (JP 2019-219147 A) discloses a technique for determining a combustion state of a burner using a training model generated by machine learning of a feature amount extracted from an image of flame in a thermal power generation system.

CITATION LIST

Patent Literature

[PTL 1] JP 2019-219147 A

SUMMARY OF INVENTION

Technical Problem

When the operation state of the plant is normal, a normal operation state can be maintained by process control. However, there is a case where the operation state of the plant becomes an abnormal state that cannot be controlled by process control for some reason. In such cases, in order to eliminate the abnormal state, an expert manually operates the plant based on know-how and knowledge, or an operator who operates the plant or a worker who performs work such as component replacement, for example, operates or works the plant in accordance with a predetermined rule (manual). As plants include a wide variety of devices, the causes of abnormal states vary. For this reason, there is a problem that in a situation where know-how, knowledge, and a manual of an expert are relied on, it is difficult to quickly and accurately cope with an abnormal state, an inefficient state, and the like to be improved.

The present invention has been devised in order to solve the above problems. That is, a main object of the present invention is to provide a technique for appropriately supporting control of a plant without relying on the know-how and knowledge of experts and manuals.

Solution to Problem

In order to achieve the above object, a plant control support system according to the present invention, as an embodiment, includes:
an acquisition unit that acquires state information regarding a state of a plant;
a generation unit that generates, as proposed control content, a control content depending on a state of the plant based on the state information by using a control model that has been trained on a relationship between control content for controlling the plant and a control result obtained by executing control based on the control content on the plant; and
an output unit that outputs the proposed control content.

A proposal method according to the present invention includes, as an embodiment,
by a computer,
acquiring state information regarding a state of a plant;
generating, as proposed control content, a control content depending on a state of the plant based on the state information by using a control model that has been trained on a relationship between control content for controlling the plant and a control result obtained by executing control based on the control content on the plant; and
outputting the proposed control content.

A program storage medium according to the present invention stores, as an embodiment, a computer program for causing a computer to execute
processing of acquiring state information regarding a state of a plant,
processing of generating, as proposed control content, a control content depending on a state of the plant based on the state information by using a control model that has been trained on a relationship between control content for controlling the plant and a control result obtained by executing control based on the control content on the plant, and processing of outputting the proposed control content.

Advantageous Effects of Invention

According to the present invention, it is possible to appropriately support control of a plant depending on the state of the plant without relying on the know-how and knowledge of experts and manuals.

EXAMPLE EMBODIMENT

Example embodiments according to the present invention will be explained below with reference to the drawings.

First Example Embodiment

Figure 1:
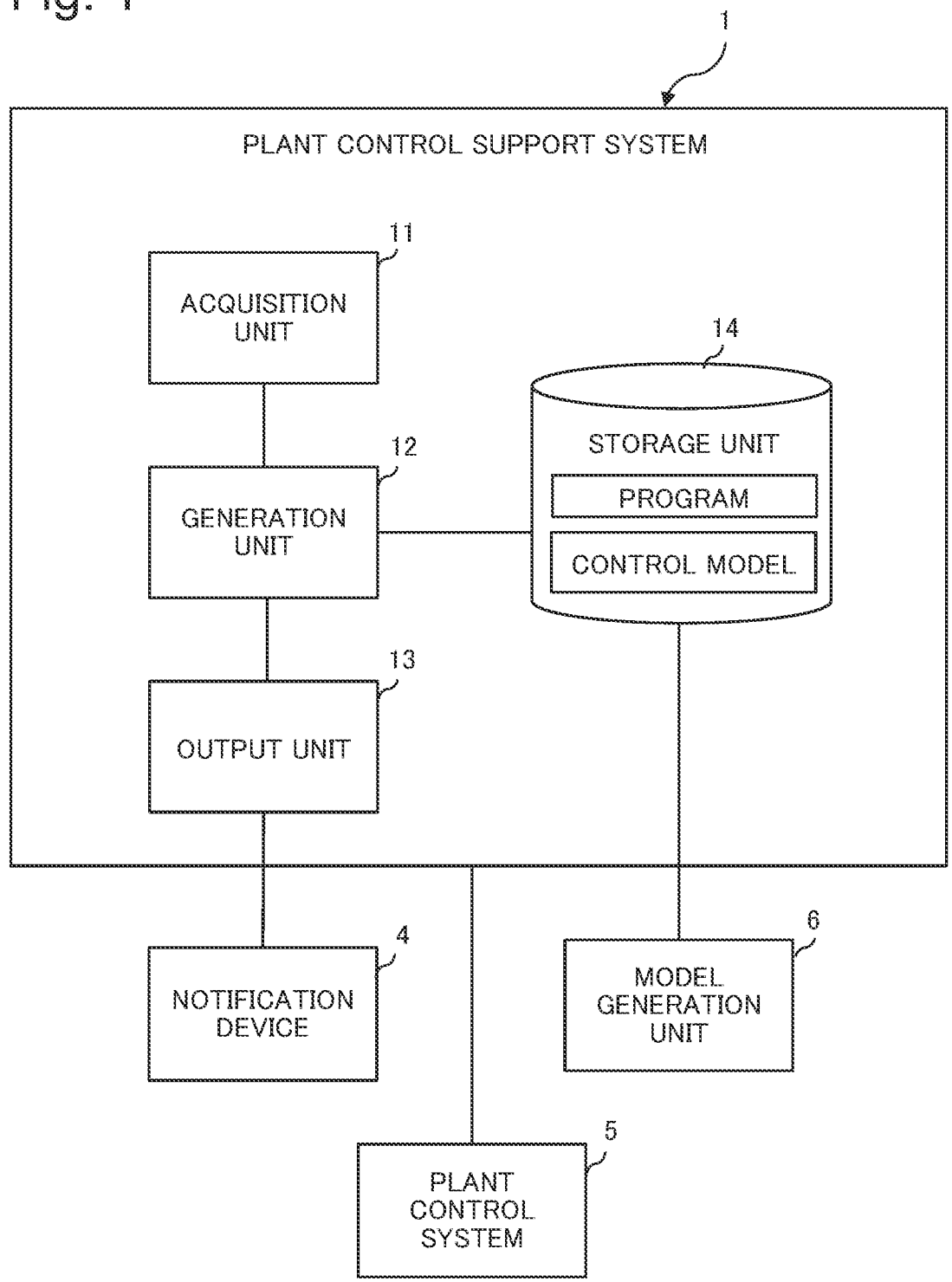
FIG. 1 is a block diagram illustrating a functional configuration of a plant control support system according to a first example embodiment of the present invention.

FIG. 1 is a block diagram illustrating a functional configuration of the plant control support system according to the first example embodiment of the present invention. A plant control support system 1 is a system that proposes control content for controlling the operation of a plant depending on the state of the plant. A plant is a facility where a plurality of types of devices operate in cooperation. Although there are a plurality of types of plants, in the first example embodiment, the plant control support system 1 will be explained with a power plant as an example.

As illustrated in FIG. 1, the plant control support system 1 includes an acquisition unit 11, a generation unit 12, an output unit 13, and a storage unit 14.

The storage unit 14 stores various data and computer programs (hereinafter, also referred to as program). The storage unit 14 stores a control model. This control model is a model for generating, as proposed control content, control content of the plant depending on the state of the plant. This control model is generated with machine learning by a model generation unit 6.

That is, in the plant, an index (hereinafter, also referred to as key performance indicator (KPI)) representing the state of the plant and a target value of the KPI are defined. Examples of KPI include thermal efficiency in a case of a power plant. This thermal efficiency is a ratio at which thermal energy (calorific value) by fuel can be converted into electric energy (power generation amount). Other examples of KPI in power plants include power generation amount and power generation efficiency. Still other examples of KPI in power plants include emission amount of harmful substances such as SOx and NOx in exhaust gas.

Control content (that is, proposed control content) of the plant depending on the state of the plant is, for example, control content (that is, control content for improving KPI) for achieving a good state in which the KPI in the plant is equal to or greater than the target value. Such proposed control content includes at least one of a control command for controlling the plant and an action (that is, action instruction to an operator or a worker in the plant) to be executed by the operator or the worker of the plant. In the following explanation, the operator and the worker are sometimes simply referred to as operator without distinction. That is, an operator may include a worker.

Specific examples of the control command include a command for stopping a water supply pump, a command for fully opening a valve, and a command for turning on or off a switch of a sensor.

Specific examples of actions (action instructions to the operator and the worker) of the operator and the worker include an action for changing a setting value such as changing the opening degree of an adjustment valve from 30% to 50% and an action for moving a device or a component such as opening or closing an electromagnetic valve.

There is not only a case where one KPI is defined but also a case where a plurality of KPIs are defined. In the case where a plurality of KPIs are defined, execution of a certain control to the plant can improve one KPI while deteriorating another KPI. In consideration of such a matter, the proposed control content may be control content in consideration of a balance between improvement and deterioration of each KPI by control of the control content, or may be control content mainly for improving an emphasized KPI. In a case of executing, in a plant, control based on control content mainly for improving an emphasized KPI selected from a plurality of KPIs, the emphasized KPI is improved, but there can be a KPI that deteriorates.

Figure 2:
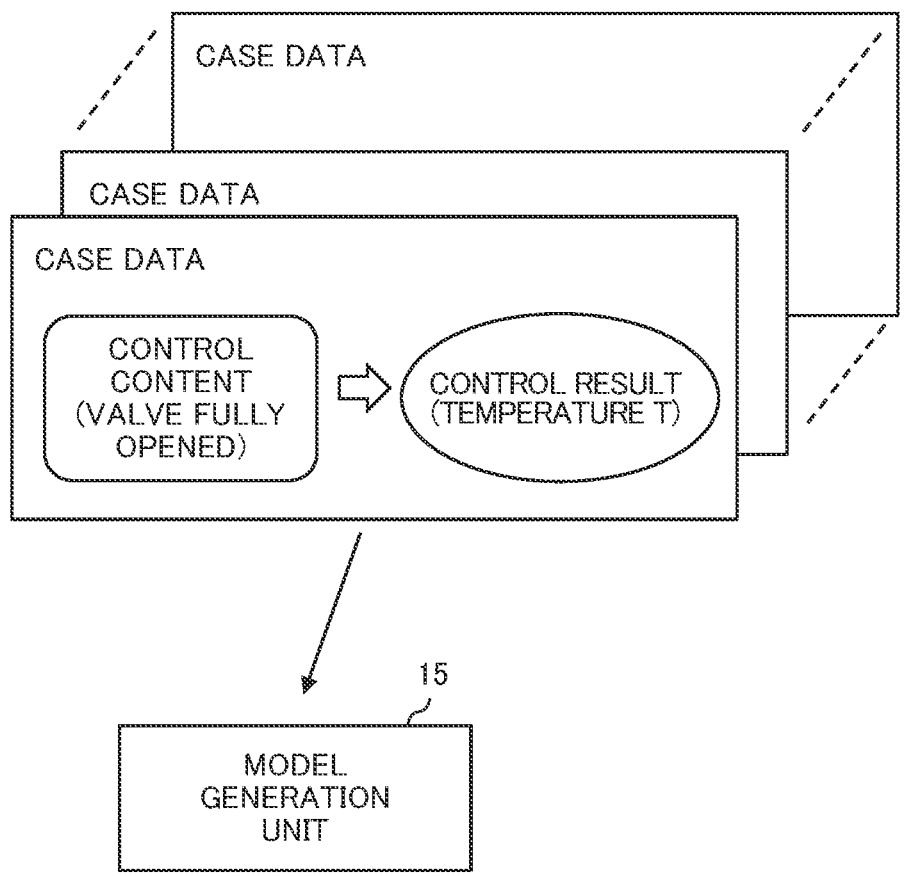
FIG. 2 is a view explaining an example of case data used for generation of a control model used by a plant control support system.

In the plant control support system 1, a control model is generated by performing machine learning on case data as illustrated in the model diagram of FIG. 2. That is, this control model is generated by being trained on the relationship between the control content for controlling the plant and a control result obtained by executing the control of the control content on the plant. The case data includes the control content and its control result obtained by executing the control of the control content on the plant. The control content included in the case data includes at least one of the control command as described above and the action of the operator (action instruction to the operator or the worker in the plant).

The control result included in the case data is, for example, information indicating the state of a constituent part (for example, a device constituting a plant or a component such as a pump or a turbine) of a plant related to the state of the plant, and the information indicating the state is acquired by a sensor. For example, a control result obtained by executing the control content of fully opening a valve provided in a flow path of cooling water is the detection temperature of a temperature sensor provided in the tank. The control result may be information indicating the state of the entire plant such as a power generation amount of the power plant.

In the first example embodiment, the case data used for generation of the control model includes successful case data and failure case data. The successful case data is data including a control result indicating that the state of the plant has been improved by executing the control of the control content. The failure case data is data including a control result indicating that the state of the plant has not been improved by executing the control of the control content. The case data used for generation of the control model is associated with information indicating whether to be successful case data or to be failure case data.

The control content and its control result included in one case data are not limited to one each, and one or both of the control content and its control result may be plural. For example, in the example indicated in the model diagram of FIG. 3, the control content of the case data is a history of the control content executed within a preset period. That is, the case data includes, as control content, a control pattern in which a plurality of pieces of control content are arranged in time series, the control pattern indicating that after control content A1 is executed, control content B0 is executed, and further control content A2 is executed. Alternatively, when control of a plurality of pieces of control content is executed in parallel, the plurality of pieces of control content may be collectively included in the case data as control content regardless of time series.

Figure 3:
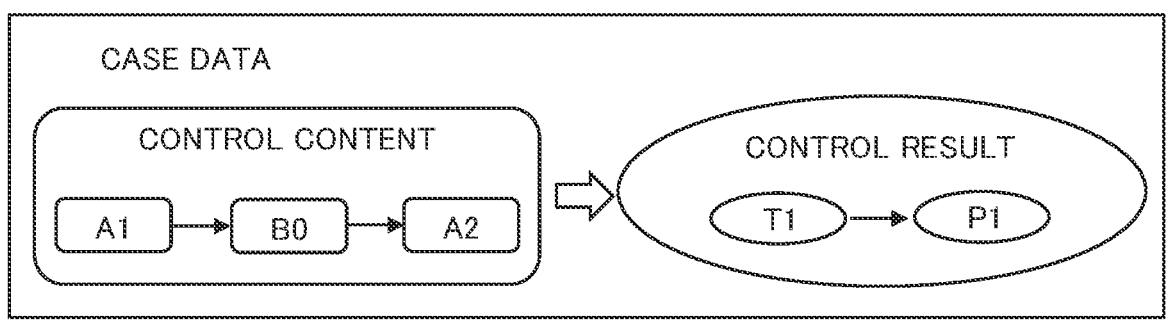
FIG. 3 is a view explaining another example of case data.

Furthermore, in the example of FIG. 3, in the control result in the case data, the state of the plant due to execution of control of the control content is represented in time series. That is, the case data includes, as a control result, a time-series pattern related to the state of the plant such as the power generation amount having changed to "P1" after the temperature has changed to "T1". Alternatively, in a case where a plurality of states of the plant change substantially simultaneously due to execution of the control of the control content, the states of the plurality of plants may be included in the case data as the control result regardless of the time series.

A plant is a facility where a plurality of types of devices operate in cooperation. There are various combinations of a plurality of devices constituting a plant, and even a combination of similar devices does not necessarily have the same plant control method. Therefore, the control content for improving the state of the plant in a case where the KPI becomes worse than the target value differs depending on the plant, and the state of the plant that is the control result also differs. For this reason, the control content and its control result included in the case data are in consideration of the KPI such as the types and combinations of the plurality of devices constituting the target plant and the operation control method, and are not particularly limited to those described above.

The control model is generated by the model generation unit 6 so as to generate proposed control content depending on the state of the plant by performing machine learning on the control content (strategy) close to a successful case and far from a failure case using the case data as described above. There are various methods of machine learning, and a method appropriately selected based on the type of the target plant, the proposed control content to be generated by the control model, and the like may be used for generation of the control model. For example, instead of machine learning using successful case data and failure case data, a control model may be generated by machine learning not using failure case data. Alternatively, a control model may be generated by machine learning using only failure case data. In this case, for example, a control model that generates control content (strategy) far from failure case as proposed control content is generated.

The storage unit 14 stores the control model as described above.

The acquisition unit 11 acquires state information regarding the state of a target plant. The state information acquired by the acquisition unit 11 is related to the control content of the case data subjected to machine learning by the model generation unit 6, its control result, and the proposed control content generated by the control model. Therefore, the state information acquired by the acquisition unit 11 is information defined based on the control content of the case data, its control result, and the proposed control content.

Examples of state information includes a state of a constituent part (for example, components such as a pump and a turbine constituting the plant) of the plant related to the operation state of the plant. This state information is expressed using, for example, an output value (hereinafter, also referred to as sensor value) of the sensor. For example, the state information is information such as temperature, a flow rate, an air volume, the number of rotations of a turbine, a rotation speed of the turbine, a vibration frequency, pressure, a current value, a voltage value, and a gas concentration. The number of sensor values included in the state information is not limited to one, and may be plural. The number of sensors that are the output sources of the sensor values included in the state information is not limited to one, and the state information may include a plurality of sensor values based on a plurality of sensors provided in different constituent parts in the plant, for example. Alternatively, the state information may include a plurality of sensor values based on a plurality of types of sensors provided in a similar constituent part in the plant. The state information is only required to be information regarding the state of the plant, and is not limited to the above example.

Alternatively, the state information may be information obtained by analyzing a log of sensor values not only at the acquisition time point but also in the past in a predetermined period back from the acquisition time point. For example, the state information is expressed by history information in which a plurality of sensor values based on one sensor in the past in a predetermined period back from the acquisition time point are arranged in time series, or information indicating how the sensor value has changed. Alternatively, the state information may be expressed by history information of a plurality of sensor values based on a plurality of sensors or information indicating how the sensor value has changed for each of the plurality of sensors.

When acquiring the sensor value at the acquisition time point, the acquisition unit 11 indirectly acquires the sensor value via a plant control system 5 that controls the plant or directly acquires the sensor value from the sensor of the plant. When acquiring a log of a predetermined past sensor value, the acquisition unit 11 acquires the log from the plant control system 5 that stores the log of the sensor value. Alternatively, a proposal device 3 may generate a log of the sensor value in the storage unit 14, and the acquisition unit 11 may acquire the log of the sensor value from the storage unit 14.

Another example of the state information may be a flag indicating a state such as start, stopping, or stop of the system recorded in a specific sensor. Furthermore, another example of the state information may be information regarding the state of the entire plant (for example, the power generation amount of the power plant). Furthermore, another example of the state information includes data obtained by analyzing the sensor value.

The generation unit 12 generates proposed control content depending on the state of the target plant based on the plant state information acquired by the acquisition unit 11 and the control model of the storage unit 14. For example, the generation unit 12 may generate the proposed control content in response to a predetermined trigger instead of always generating the proposed control content. The predetermined trigger is, for example, at the time of becoming the following start state.

The start state is, for example, a case where the plant is in an abnormal situation (hereinafter, also referred to as KPI abnormality) in which the time during which the KPI deteriorates to be less than the target value becomes equal to or more than predetermined attention time Ct. That is, the start state is a state in which the time during which the KPI is less than the target value continues for a predetermined time (attention time Ct). The KPI abnormality is detected by, for example, the plant control system 5. From this, the plant control support system 1 is connected to the plant control system 5, and when the plant control system 5 detects the KPI abnormality and issues an alarm, the generation unit 12 generates proposed control content assuming the start state based on the alarm.

Alternatively, the plant control support system 1 may acquire information of the KPI at that time point from the plant control system 5 at predetermined time intervals. Then, upon detecting an occurrence of the KPI abnormality based on the acquired KPI information and the target value of the KPI and the attention time Ct stored in the storage unit 14, the generation unit 12 may generate proposed control content assuming the start state. Alternatively, the start state of the generation unit 12 may be a state in which a log of a specific sensor value in a predetermined period coincides with a pattern of a log for start determination given in advance. Alternatively, the start state of the generation unit 12 may be a state in which a manual operation for instructing activation is performed by the operator.

Thus, there are various states in the start state in which the generation unit 12 starts the operation, and the start state is appropriately set in consideration of the type of the target plant, the device configuration of the plant, the change pattern of the state of the plant, and the like.

Determination as to whether the generation unit 12 starts operation may be executed using a trained model generated by system invariant analysis technology (SIAT) or the like, and is not limited to determination by the generation unit 12. In addition to the above, an existing plant state determination technique may be used.

Here, a specific example of the proposed control content generated by the generation unit 12 will be described. For example, given that the acquisition unit 11 has acquired the state information based on the sensor value that the rotation speed of the turbine when a KPI abnormality of a power plant is detected is equal to or less than a threshold St. In this case, examples of the proposed control content for improving the state of the power plant (that is, increasing the rotation speed of the turbine to be higher than the threshold) include control content (control command) of stopping the operation state of the pump and control content (control command) of changing the opening degree of a valve to full opening. Another example of the proposed control content is one that includes a plurality of pieces of control content such as stopping the operation state of the pump and changing the opening degree of the valve to full opening. Another example of the proposed control content is one that includes a plurality of pieces of control content in time series in which the opening degree of the valve is changed to full opening and then the operation state of the pump is changed to the stopped state.

Furthermore, another specific example assumes that the acquisition unit 11 acquires state information that the power generation efficiency of the power plant is equal to or less than a threshold Se. In this case, examples of the proposed control content for improving the state of the power plant include control content (action of the operator) of changing the opening degree of the adjustment valve from 30% to 15% and control content (action of the operator) of changing the target temperature of the temperature control from 130 degrees to 150 degrees. Other examples of the proposed control content include those including a plurality of pieces of such control content (actions of the operator) and those including a plurality of pieces of control content in time series (actions of the operator).

The output unit 13 outputs the proposed control content generated by the generation unit 12. The proposed control content output by the output unit 13 may be transmitted to a notification destination designated in advance via an information communication network, for example, or may be written in a predetermined storage device (not illustrated). Alternatively, the output unit 13 transmits the proposed control content to a notification device 4. By this, the notification device 4 may notify the operator or the worker of the proposed control content. The notification device 4 is a device that visually and/or audibly notifies information, and is, for example, a device including a display device such as a smartphone, a tablet, a wearable device, or a personal computer (PC) and a speaker. The output unit 13 may function as a display control unit and control the notification device to display the proposed control content on a display included in the notification device. As described above, the proposed control content is notified by the notification operation of the notification device 4, and the operator of the plant operates or works the plant based on the proposed control content, thereby improving the state of the plant.

Here, an example of a hardware configuration of the plant control support system 1 will be explained. The storage unit 14 includes a storage device that is a storage medium for storing data and programs. There are various types of storage devices such as a magnetic disk device and a semiconductor memory, but the storage unit 14 may include any type of storage device. The storage device constituting the storage unit 14 is not limited to one type, and the storage unit 14 may include a plurality of types of storage devices.

Figure 4:
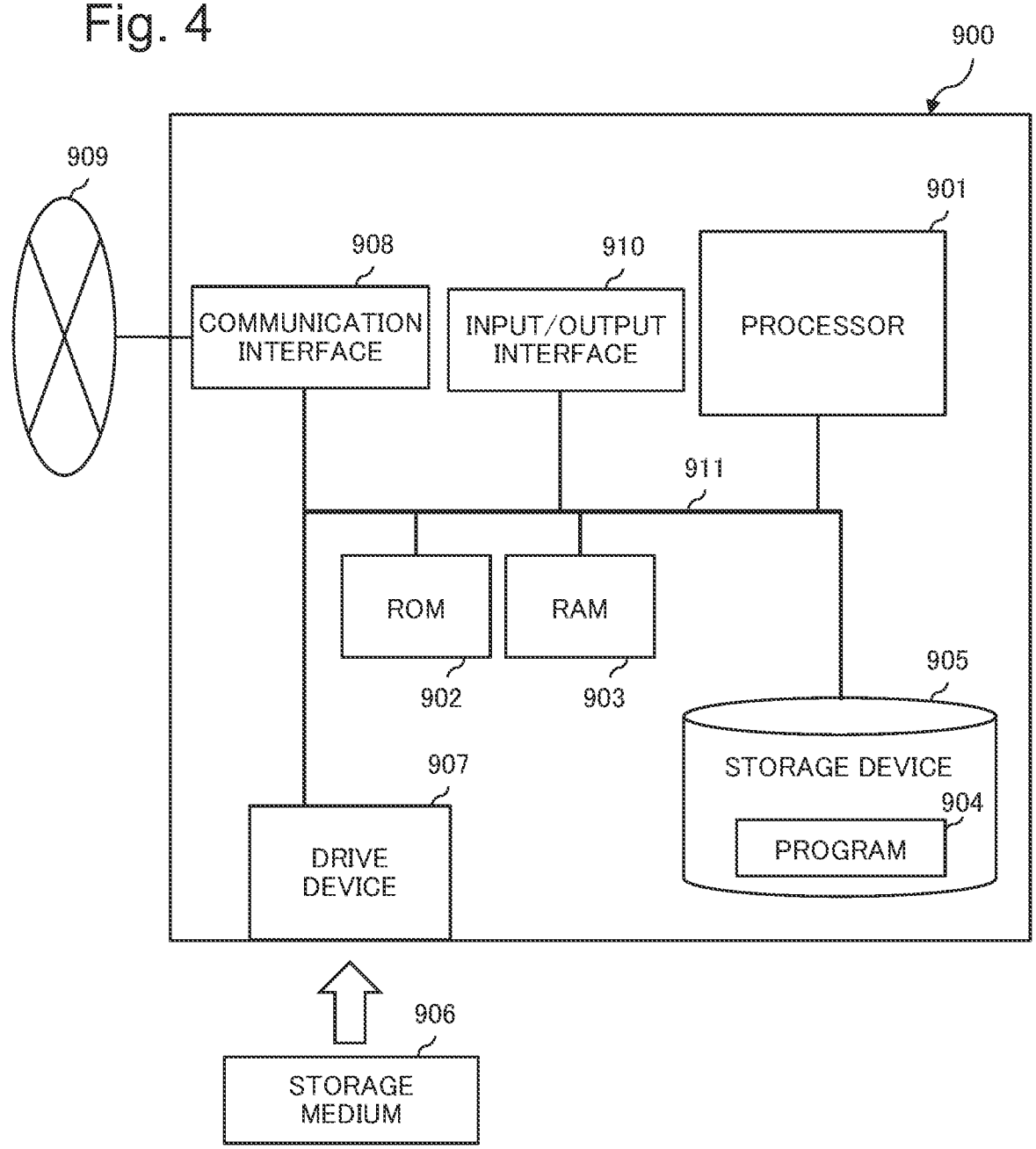
FIG. 4 is a view explaining an example of a hardware configuration related to an acquisition unit, a generation unit, and an output unit in a plant control support system.

The acquisition unit 11, the generation unit 12, and the output unit 13 are implemented by, for example, a processor 901 of a computer device 900 as illustrated in FIG. 4, for example. The computer device 900 illustrated in FIG. 4 is an example of a computer device, and includes the following configuration.

Processor 901 such as a central processing unit (CPU) or a graphics processing unit (GPU)
Read only memory (ROM) 902
Random access memory (RAM) 903
Computer program (program) 904 loaded into the RAM 903
Storage device 905 storing the program 904
Drive device 907 that reads and writes a storage medium 906
Communication interface 908 connected to a communication network 909
Input/output interface 910 for inputting/outputting data
Bus 911 connecting each constituent element The acquisition unit 11, the generation unit 12, and the output unit 13 included in the plant control support system 1 are implemented by the processor 901 acquiring and executing the program 904 that implements these functions. The program 904 is stored in the storage device 905 or the ROM 902 in advance, for example, and the processor 901 loads the program into the RAM 903 and executes the program as necessary. The program 904 may be supplied to the processor 901 via the communication network 909, or may be stored in advance in the storage medium 906, and the drive device 907 may read the program and supply the program to the processor 901.

Figure 5:
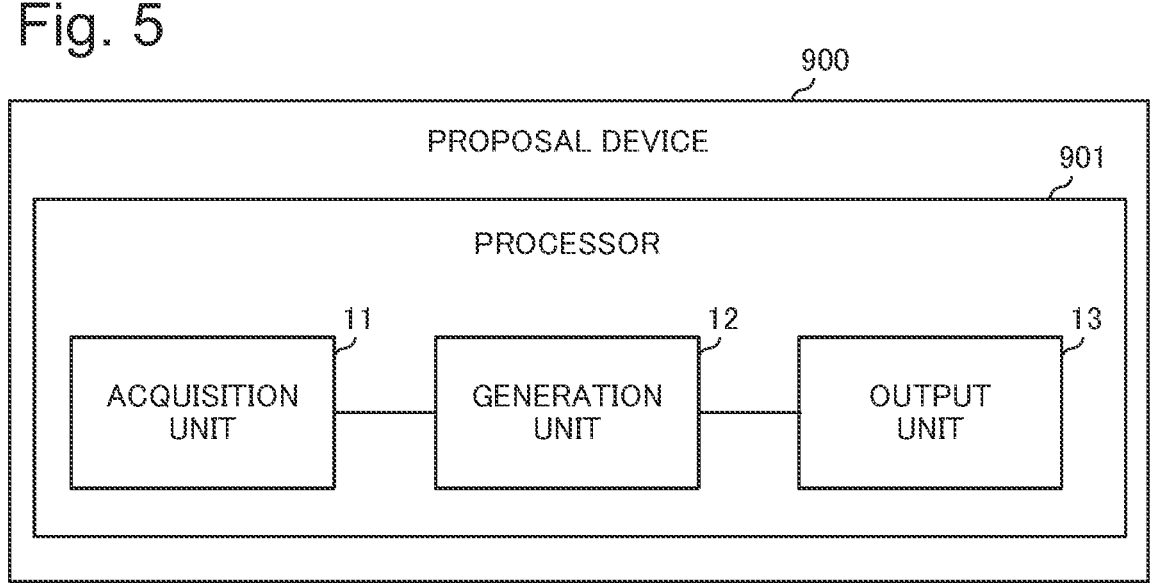
FIG. 5 is a view explaining an example in which an acquisition unit, a generation unit, and an output unit are provided in one device.
Figure 6:
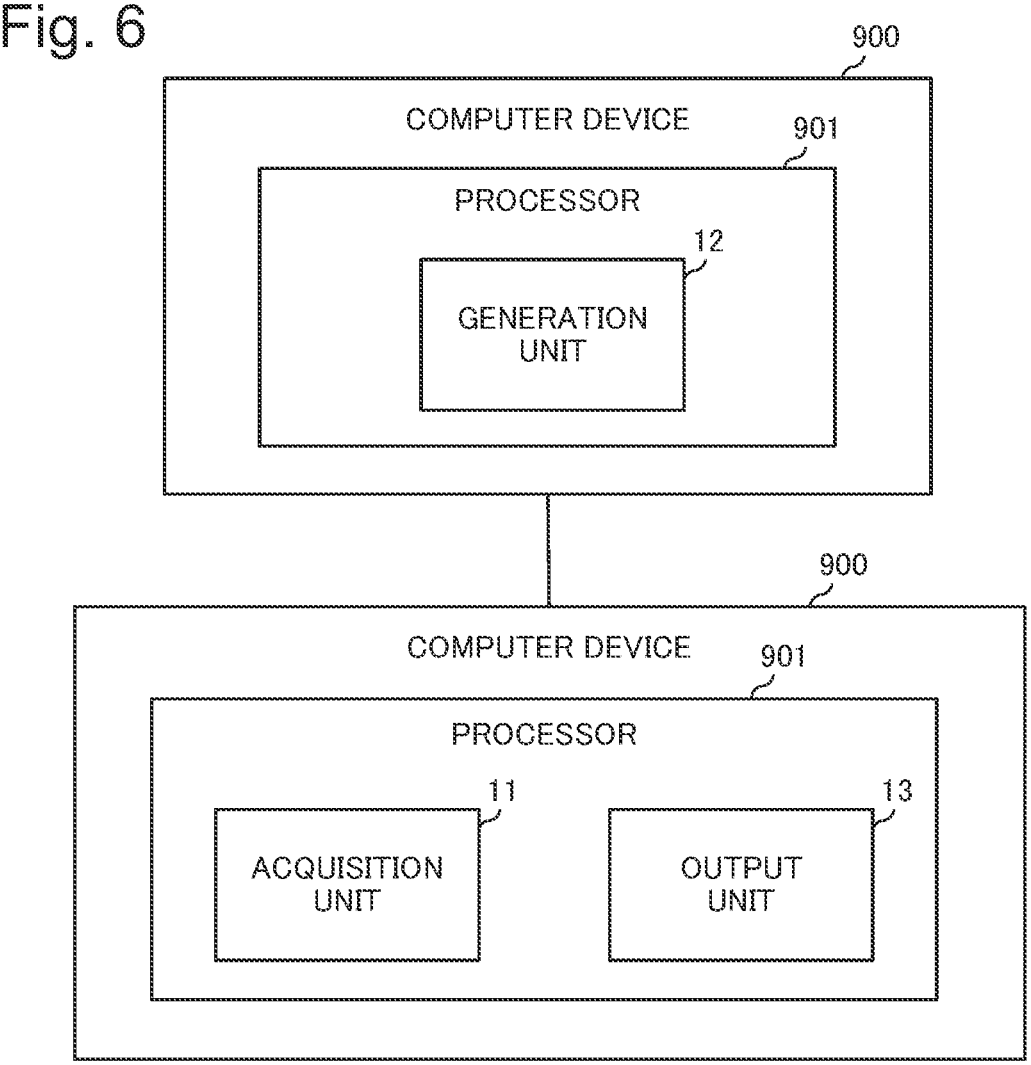
FIG. 6 is a view explaining an example in which an acquisition unit, a generation unit, and an output unit are dispersedly provided in a plurality of devices.

The acquisition unit 11, the generation unit 12, and the output unit 13 may be implemented as illustrated in FIG. 5 by the processor 901 of one device that is the computer device 900 as illustrated in FIG. 4 to constitute a proposal device, or may be implemented by processors of a plurality of the computer devices 900 as illustrated in FIG. 6. In the example of FIG. 6, the acquisition unit 11 and the output unit 13 are included in the processor 901 of the computer device 900 arranged in a control room of the plant, for example, and the generation unit 12 is included in the processor 901 of the computer device 900 that is a server installed in a place different from the control room of the plant.

Figure 7:
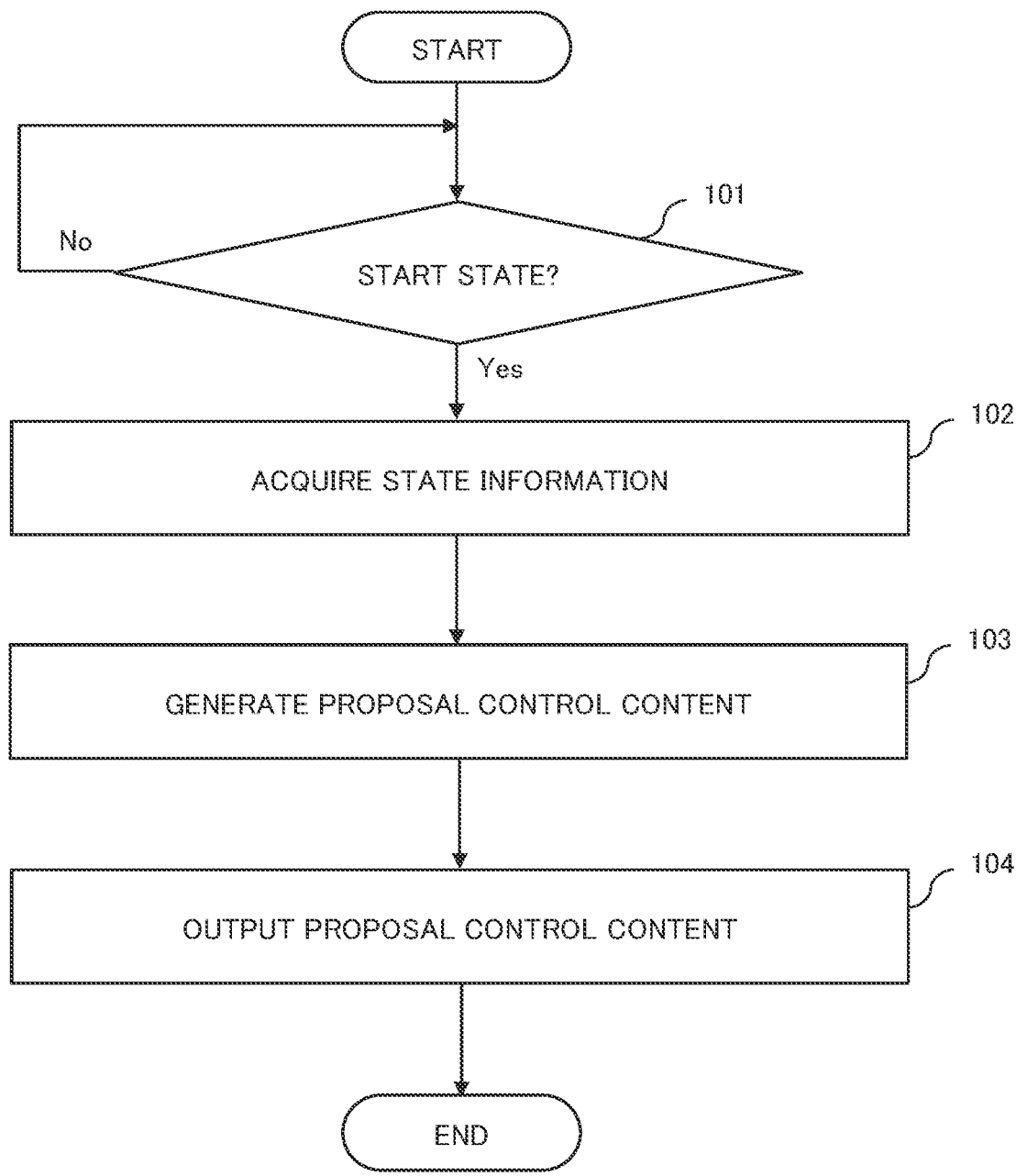
FIG. 7 is a flowchart explaining an example of operation of a plant control support system.

Hereinafter, an example of the operation of the plant control support system 1 according to the present invention will be explained with reference to FIG. 7. FIG. 7 is a flowchart presenting the operation of the plant control support system 1. For example, first, it is determined whether the generation unit 12 is in the start state (step 101 in FIG. 7). Due to this, if it is determined not to be the start state, the determination operation in step 101 is executed again. On the other hand, if it is determined to be the start state, the acquisition unit 11 acquires state information regarding the state of the plant (step 102). Then, using the state information and the control model of the storage unit 14, the generation unit 12 generates proposed control content depending on the state of the plant (step 103).

Thereafter, the output unit 13 outputs the proposed control content (step 104). This output proposed control content is notified by the notification device 4, for example, and the operator of the plant operates the plant based on a control command included in the proposed control content or the operator or the worker responds based on an action instruction included in the proposed control content, whereby the state of the plant can be improved.

The plant control support system 1 of the first example embodiment is configured as described above. Using a control model generated by performing machine learning of a relationship between control content for the plant and its control result, this plant control support system 1 generates and outputs proposed control content depending on the state of the plant. By being based on such proposed control content, the operator or the worker of the plant can operate or work the plant to improve the state of the plant with appropriate control content depending on the state of the plant without relying on the know-how and knowledge of experts and manuals. The plant control support system 1 can shorten the time from deterioration of the state of the plant to improvement of the state of the plant. That is, the plant control support system 1 can provide a technique for appropriately supporting control of a plant without relying on the know-how and knowledge of experts and manuals.

Figure 8:
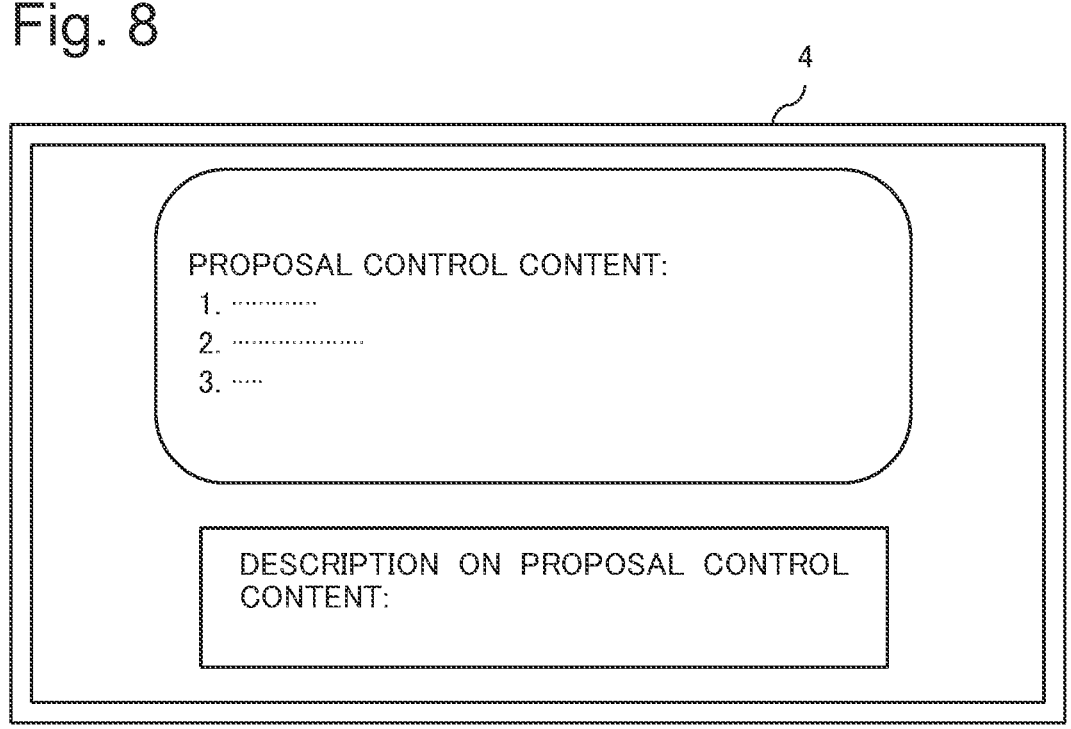
FIG. 8 is a view illustrating an example of a notification mode when proposed control content and its explanation are output from a plant control support system.

The generation unit 12 may generate, in addition to the proposed control content, an explanation (explanatory information) of a basis, a reason, and the like for generating the proposed control content. As the explanatory information regarding the proposed control content, for example, explanations assumed to be useful for the operator or the worker to perform operation or work of the plant, such as a basis on which the proposed control content has been proposed and a sensor value used for generation of the proposed control content, are generated as the explanatory information. In a case where the generation unit 12 generates the explanatory information as described above, for example, the case data used for generation of the control model by the model generation unit 6 is annotated with explanatory information (basis, reason, and the like) for explaining the data. An acquisition method for the explanatory information can be acquired by the operator inputting a basis and a reason indicating why such control has been performed in the past case, but is not limited to this method. The model generation unit 6 generates a control model for generating not only the proposed control content but also an explanation of the proposed control content by machine learning using the annotated case data. By using such a control model, the generation unit 12 generates not only the proposed control content depending on the state of the plant but also an explanation of the proposed control content. The generated proposed control content and its explanation are output by the output unit 13, and are notified to the operator or the worker of the plant by the notification device 4 as illustrated in FIG. 8, for example.

Specifically, the generation unit 12 generates proposed control content such as "1. Change opening degree of adjustment valve A from 30% to 15%", "2. Change set temperature from 80 degrees to 85 degrees", and "3. Change opening degree of adjustment valve B from 20% to 35%", and the output unit 13 outputs the proposed control content. As an explanation (explanatory information) on the proposed control content, the generation unit 12 generates explanatory information such as, for example, "the number of rotations of the turbine is lower than a threshold K, and this lowering in the number of rotations is considered to be the cause of lowering in the turbine efficiency (KPI), and therefore, in order to increase the number of rotations of the turbine, the opening degrees of the adjustment valve A and the adjustment valve B are changed. The set temperature is changed in order to respond to change in the water supply flow rate due to this change", and the output unit 13 outputs the explanatory information.

The number of pieces of proposed control content generated by the generation unit 12 is not limited to one, and a plurality of different pieces of proposed control content may be generated by the generation unit 12. In this case, the output unit 13 outputs a plurality of pieces of generated proposed control content, and for example, the notification device 4 notifies the operator or the like of the plant of the plurality of pieces of proposed control content. Due to this, the operator of the plant may be able to select the control content adopted for the operation (work). In this case, the control model is generated by machine learning so as to generate a plurality of pieces of proposed control content depending on the state of the plant. When generating a plurality of pieces of proposed control content, the generation unit 12 may generate the explanation of the proposed control content as described above together with the proposed control content. In this case, the explanation of the proposed control content becomes effective information for the operator to select the proposed control content to be adopted.

Figure 9:
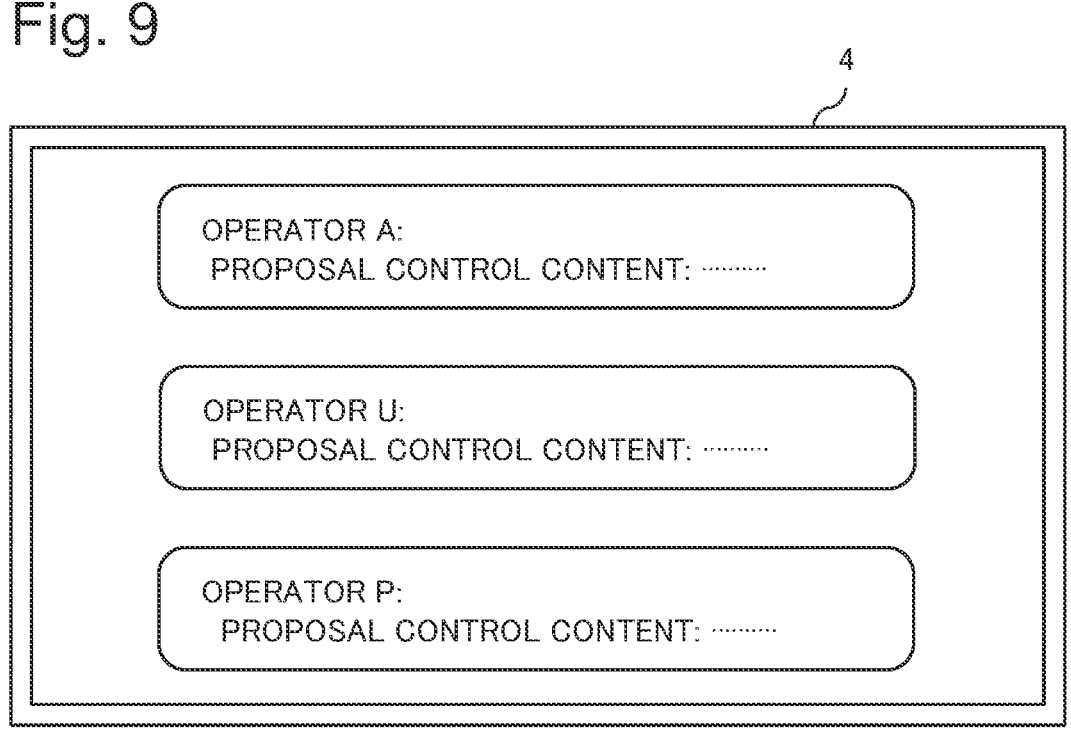
FIG. 9 is a view illustrating an example of a notification mode when proposed control content for each operator is output from a plant control support system.

Furthermore, when there are a plurality of operators of the plant, proposed control content for each operator may be generated by the generation unit 12 and notified by the notification device 4 as illustrated in FIG. 9. In this case, attribute information for classifying the operators is set, and the case data used by the model generation unit 6 for generation of the control model is given the attribute information of the operators related to the data. The attribute information of the operators includes an operation area in charge, a field of specialization, years of experience, past work history, skill information regarding job and ability that can be handled, and the like. By machine learning using such case data, the model generation unit 6 generates, for each operator, a control model for generating the proposed control content depending on the state of the plant. The generation unit 12 can also generate, for each operator, proposed control content depending on the state of the plant by using such a control model and attribute information of the operator during the operation (work) who is in charge of the operation (work) of the plant. Even when there is one operator of the plant, the generation unit 12 may generate the proposed control content depending on the state of the plant and the attribute of the operator by using the attribute information of the operator during the operation (work).

Second Example Embodiment

Hereinafter, the second example embodiment according to the present invention will be explained. In the explanation of the second example embodiment, the same reference signs are given to the same name parts as the constituent parts constituting the plant control support system of the first example embodiment, and redundant description of the common parts will be omitted.

In the second example embodiment, a case where the plant control support system 1 having the functional configuration explained in the first example embodiment is applied to a chemical plant will be explained.

In the case of a chemical plant, there is a case of setting a KPI (thermal efficiency, power generation amount, power generation efficiency, emission amount of harmful substances in exhaust gas, and the like) related to the operation state of the plant, or there is a case of setting a KPI based on, for example, the quality or yield of a chemical product to be manufactured. The KPI based on the quality of the chemical product includes, for example, KPIs such as the component amount (component ratio) of a material such as medicines of chemical products, fertilizer, or dye, the viscosity of a liquid chemical product, the resistance value of the surface of a chemical product such as a synthetic resin, and the color of a product. The yield is a ratio of a product production amount actually obtained with respect to a production amount expected from an input amount of a raw material.

Also in the chemical plant, the control model is a model for generating proposed control content depending on the state of the plant in order to improve such KPI, for example, and is generated by machine learning by the model generation unit 6 as in the first example embodiment. In the second example embodiment, since the target plant is a chemical plant, the proposed control content depending on the state of the plant may be the proposed control content depending on the operation state of the plant, or may be the proposed control content depending on the state of the product manufactured by the plant. The state information is not limited to the above as long as it is information regarding the state of the plant.

Examples of the state information acquired by the acquisition unit 11 of the plant control support system 1 include not only information related to the operation state of the plant as described in the first example embodiment but also information related to the quality of the product such as a color, concentration, purity, a particle size, a density, and a resistance value of the product. The acquisition unit 11 acquires one or a plurality of pieces of predetermined state information from such state information.

Similarly to the case of the power plant, the proposed control content related to the chemical plant by the generation unit 12 also includes at least one of the control command and the action of the operator (action instruction to the operator or the worker). Examples of the control command include control content of additionally inputting 15 kilograms of a raw material A. Other examples of the control command include a plurality of pieces of control content of additionally inputting 15 kilograms of the raw material A and 5 kilograms of a raw material B. Other examples of the control command include time series control content of additionally inputting 15 kilograms of the raw material A and then additionally inputting 5 kilograms of the raw material B. Examples of the action of the operator include control content of changing settings such as extending the time of a stirring process by 1 hour and changing the set temperature in a tank from 15 degrees to 10 degrees. Furthermore, other examples of the action of the operator include an action including a plurality of pieces of such control content (action of the operator) and an action including time series control content (control command).

Configurations other than the above in the plant control support system 1 of the second example embodiment are similar to those of the first example embodiment. That is, as described in the first example embodiment, also when the present invention is applied to a chemical plant, the generation unit 12 may generate a plurality of pieces of proposed control content, and the output unit 13 may output the plurality of pieces of proposed control content. Due to this, a plurality of pieces of proposed control content may be notified to the operator or the like of the plant by the notification device 4 so that the operator of the plant can select the control content to be adopted for the operation (work). The generation unit 12 may generate proposed control content for each operator based on the attribute information of the operator, and the output unit 13 may output the proposed control content.

Furthermore, the generation unit 12 may generate, in addition to the proposed control content, explanatory information of the proposed control content. As a specific example, the generation unit 12 generates proposed control content such as "1. Additionally input 15 kilograms of raw material A", "2. Additionally input 30 kilograms of raw material B", and "3. Extend heating time for 3 hours". As explanation (explanatory information) for the proposed control content, the generation unit 12 generates explanatory information such as "Since the color of the product that is a KPI is a rank C worse than a target rank A and the viscosity is a rank S3 lower than a target rank S1, the input amounts of the raw material A and the raw material B are changed to improve the color, and the heating time is extended to improve the viscosity", for example. Then, the output unit 13 outputs the proposed control content and the explanatory information generated by the generation unit 12.

Similarly to the first example embodiment, the plant control support system 1 of this second example embodiment generates and outputs proposed control content depending on the state of the plant using a control model generated by performing machine learning on a relationship between control content for the plant and its control result. Due to this, in a chemical plant, the plant control support system 1 of the second example embodiment can improve the operation state of the plant and the state of the product of the plant without relying on the know-how and knowledge of experts and manuals by the operation and work of the plant by the operator based on the proposed control content. That is, the plant control support system 1 can provide a technique for appropriately supporting control of a plant without relying on the know-how and knowledge of experts and manuals.

Other Example Embodiments

The present invention is not limited to the first and second example embodiments, and various modes can be adopted. For example, in the first and second example embodiments, the case data used for generation of the control model includes successful case data and failure case data. Alternatively, for example, the case data may include expert data and beginner data. The expert data is case data including control content executed by an expert and its control result, and the beginner data is case data including control content executed by a beginner and its control result. In the case of using the expert data and the beginner data, the control model is generated, for example, by the model generation unit 6 performing machine learning of control content (strategy) close to an expert case and far from a beginner case.

Figure 10:
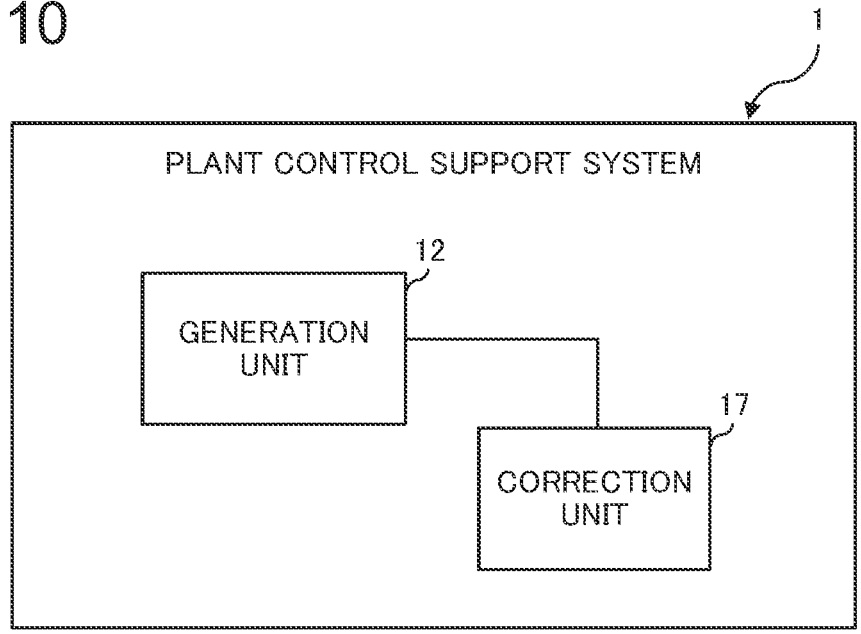
FIG. 10 is a block diagram explaining another example embodiment according to the present invention.

In addition to the plant control support system 1 of the first or second example embodiment, the plant control support system 1 may include a correction unit 17 as illustrated in FIG. 10. In order to achieve general-purpose use of the control model, the correction unit 17 corrects the proposed control content generated by the generation unit 12 depending on the performance or configuration of the control target related to the proposed control content. In the case of including such the correction unit 17, the storage unit 14 stores information on performance of constituent parts in the plant targeted by the plant control support system 1, for example. Furthermore, the storage unit 14 stores not a plant-dedicated control model targeted by the plant control support system 1 but a standard control model related to a plant having a configuration and performance assumed to be standard in the classification in accordance with the plant targeted by the plant control support system 1. The generation unit 12 generates proposed control content using such a standard control model. Even if the generation unit 12 uses the standard control model in this manner, since the plant control support system 1 includes the correction unit 17, the proposed control content suitable for the configuration and performance of the target plant can be output. In FIG. 10, illustration of the acquisition unit 11, the generation unit 12, the output unit 13, and the storage unit 14 is omitted.

Furthermore, the first example embodiment explains an example in which the plant control support system 1 is applied to a power plant, and the second example embodiment explains an example in which the plant control support system 1 is applied to a chemical plant, but the plant to which the plant control support system 1 can be applied is not limited to a power plant and a chemical plant. For example, the plant control support system 1 is also applicable to a waste treatment plant. In the case of a waste treatment plant, examples of the KPI include information indicating the operation state of the plant (for example, efficiency) and the emission amount of harmful substances such as SOx and NOx. Also in the case of the waste treatment plant, similarly, one KPI may be set or a plurality of KPIs may be set.

For example, in the case of a waste treatment plant, the state information acquired by the acquisition unit 11 includes, for example, information regarding the efficiency of the plant, the NOx concentration in the exhaust gas discharged from the incinerator, and the temperature of the exhaust gas. Furthermore, examples of the proposed control content generated by the control model include control content of reducing the supply amount of the waste to the incinerator. Other examples of the proposed control content include, for example, control content of increasing or decreasing the supply amount of combustion air to the incinerator, and control content of increasing or decreasing the number of rotations of the fan in an exhaust gas treatment facility.

Figure 11:
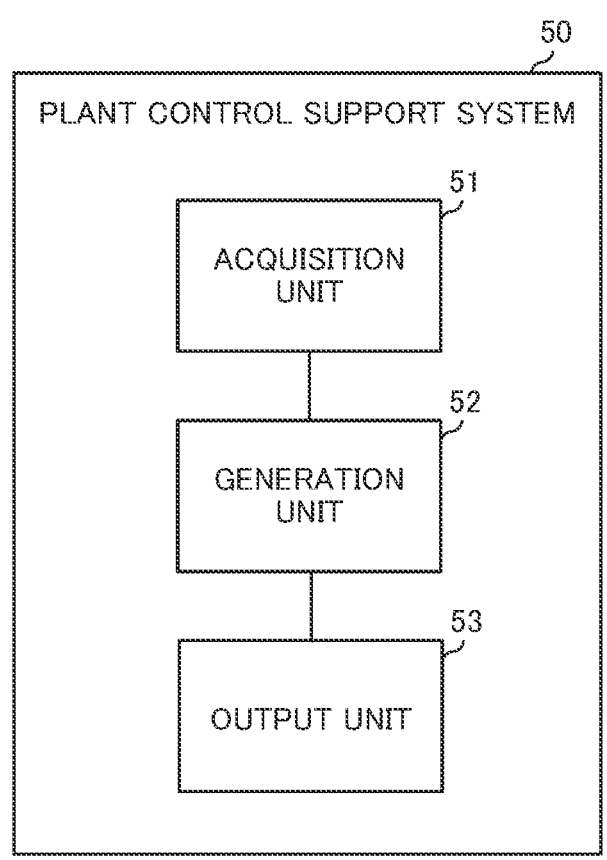
FIG. 11 is a block diagram explaining yet another example embodiment according to the present invention.

FIG. 11 is a block diagram illustrating a minimum functional configuration of the plant control support system according to the present invention. That is, a plant control support system 50 includes, for example, a computer device, and includes an acquisition unit 51, a generation unit 52, and an output unit 53. The acquisition unit 51 acquires as state information regarding the state of the plant. The generation unit 52 generates control content depending on the state of the plant as proposed control content based on the state information using a control model. The control model is a model obtained by being trained on the relationship between the control contents for controlling the plant and the control result obtained by executing the control based on the control contents on the plant. The output unit 53 outputs the proposed control content. The acquisition unit 51, the generation unit 52, and the output unit 53 are implemented by, for example, a processor. The state of the plant includes not only the operation state of the plant but also the state of a product manufactured by the plant and the state of a target object being treated by the plant.

Figure 12:
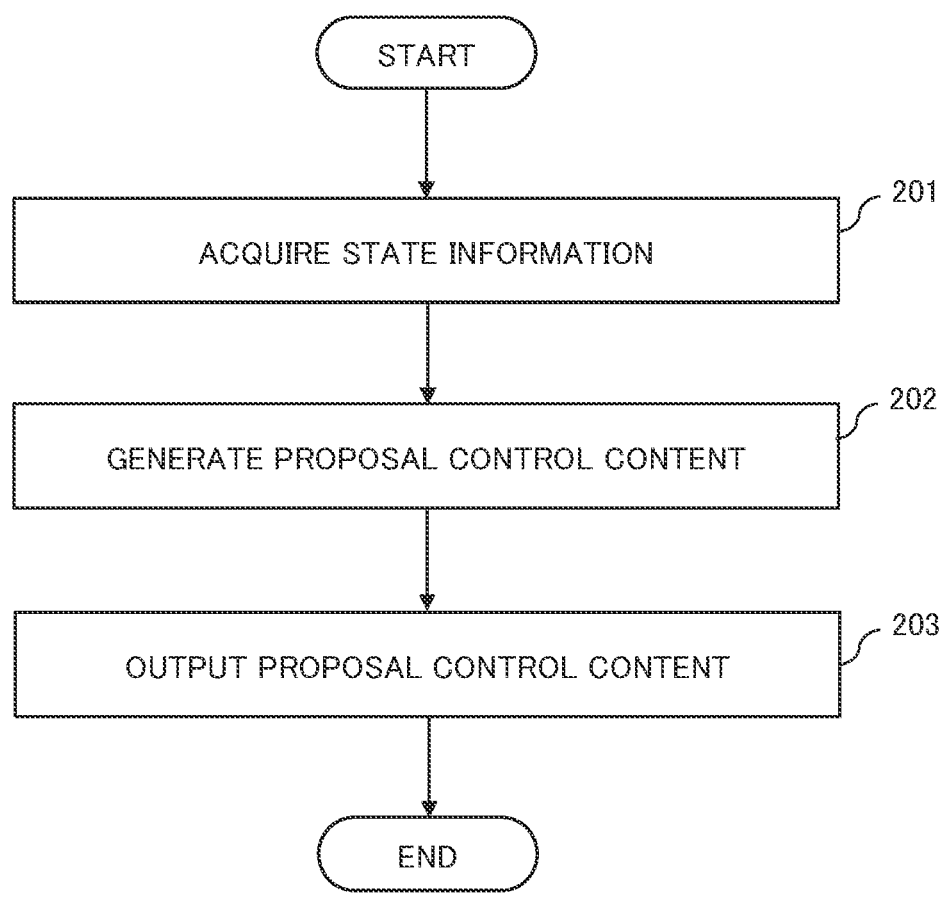
FIG. 12 is a flowchart explaining an operation example of the plant control support system illustrated in FIG. 11.

FIG. 12 is a flowchart presenting an operation example of the plant control support system 50. For example, when the acquisition unit 51 of the plant control support system 50 acquires state information of the plant (step 201), the generation unit 52 generates the control content depending on the state of the plant as the proposed control content using the control model based on the state information (step 202). Then, the output unit 53 outputs the proposed control content (step 203).

The plant control support system 50 generates and outputs the proposed control content using a control model generated by machine learning using the control content of the plant and its control result. This allows the operator of the plant to operate or work the plant with appropriate control content depending on the state of the plant without relying on the know-how and knowledge of experts and manuals.

A part or the entirety of the above example embodiments can be described as the following supplementary notes, but are not limited to the following.

Supplementary Note 1

A plant control support system including:
an acquisition unit configured to acquire state information regarding a state of a plant;
a generation unit configured to generate, as proposed control content, a control content depending on a state of the plant based on the state information by using a control model that has been trained on a relationship between control content for controlling the plant and a control result obtained by executing control based on the control content on the plant; and
an output unit configured to output the proposed control content.

Supplementary Note 2

The plant control support system according to Supplementary Note 1, in which the proposed control content includes at least one of a control command for controlling the plant and an action to be executed by an operator of the plant.

Supplementary Note 3

The plant control support system according to Supplementary Note 1 or 2, in which the generation unit generates the proposed control content in response to a predetermined trigger.

Supplementary Note 4

The plant control support system according to any one of Supplementary Notes 1 to 3, in which the state information includes at least one piece of information of temperature, a flow rate, an air volume, a number of rotations, a rotation speed, a vibration frequency, pressure, a current value, a voltage value, a power value, a gas concentration, and a resistance value of a constituent part constituting the plant.

Supplementary Note 5

The plant control support system according to any one of Supplementary Notes 1 to 3, in which, when the plant is a chemical plant, the state information includes at least one piece of information of a color, concentration, purity, a particle size, and a density of a product produced by the chemical plant.

Supplementary Note 6

The plant control support system according to any one of Supplementary Notes 1 to 5, in which
the generation unit further generates explanatory information for explaining a basis of the proposed control content, and
the output unit outputs the proposed control content and the explanatory information.

Supplementary Note 7

The plant control support system according to any one of Supplementary Notes 1 to 6, in which the generation unit generates a plurality of pieces of proposed control content.

Supplementary Note 8

The plant control support system according to any one of Supplementary Notes 1 to 7, in which the generation unit generates the proposed control content depending on a state of the plant and an operator based on the state information and attribute information of the operator of the plant, using the control model.

Supplementary Note 9

The plant control support system according to any one of Supplementary Notes 1 to 8, in which the control result includes at least one of the control result indicating that a state of the plant has been improved and the control result indicating that a state of the plant has not been improved.

Supplementary Note 10

The plant control support system according to any one of Supplementary Notes 1 to 9, further including a correction unit configured to correct the proposed control content depending on performance or a configuration of a control target related to the proposed control content.

Supplementary Note 11

A proposal device including:
an acquisition unit configured to acquire state information regarding a state of a plant;
a generation unit configured to generate, as proposed control content, a control content depending on a state of the plant based on the state information by using a control model that has been trained on a relationship between control content for controlling the plant and a control result obtained by executing control based on the control content on the plant; and
an output unit configured to output the proposed control content.

Supplementary Note 12

A proposal method including:
by a computer,
acquiring state information regarding a state of a plant;
generating, as proposed control content, a control content depending on a state of the plant based on the state information by using a control model that has been trained on a relationship between control content for controlling the plant and a control result obtained by executing control based on the control content on the plant; and
outputting the proposed control content.

Supplementary Note 13

A program storage medium that stores a computer program for causing a computer to execute
processing of acquiring state information regarding a state of a plant,
processing of generating, as proposed control content, a control content depending on a state of the plant based on the state information by using a control model that has been trained on a relationship between control content for controlling the plant and a control result obtained by executing control based on the control content on the plant, and
processing of outputting the proposed control content.

The present invention has been shown and described above using the above-described exemplary embodiments thereof as exemplary examples. However, the invention is not limited to these embodiments. It will be understood by those of ordinary skill in the art that various modes may be applied thereto without departing from the spirit and scope of the present invention as defined by the claims.

REFERENCE SIGNS LIST 1, 50 plant control support system
11, 51 acquisition unit
12, 52 generation unit
13, 53 output unit
17 correction unit

What is claimed is:
1. A plant control proposal system comprising:
at least one processor configured to:
acquire state information regarding a state of a plant;
acquire, during operation of the plant, attribute information of a plurality of operators of the plant;
generate, as proposed control content, a control content depending on the state of the plant and an operator during operation of the plant based on the state information and the attribute information of the operator by using a control model that has been trained on a relationship between control content for controlling the plant and a control result obtained by executing control based on the control content on the plant, wherein the proposed control content is generated for each operator during operation of the plant based on the respective attribute information of each operator; and output the proposed control content.

2. The plant control proposal system according to claim 1, wherein the proposed control content includes at least one of a control command for controlling the plant and an action to be executed by an operator of the plant.

3. The plant control proposal system according to claim 1, wherein the at least one processor generates the proposed control content in response to a predetermined trigger.

4. The plant control proposal system according to claim 1, wherein the state information includes at least one piece of information of temperature, a flow rate, an air volume, a number of rotations, a rotation speed, a vibration frequency, pressure, a current value, a voltage value, a power value, a gas concentration, and a resistance value of a constituent part of the plant.

5. The plant control proposal system according to claim 1, wherein, when the plant is a chemical plant, the state information includes at least one of: a color, concentration, purity, a particle size, and a density of a product produced by the chemical plant.

6. The plant control proposal system according to claim 1, wherein the at least one processor further generates explanatory information explaining a basis for the proposed control content, and outputs the proposed control content and the explanatory information.

7. The plant control proposal system according to claim 1, wherein the at least one processor generates a plurality of pieces of proposed control content.

8. The plant control proposal system according to claim 1, wherein the control result includes at least one of a control result indicating that the state of the plant has been improved and a control result indicating that the state of the plant has not improved.

9. The plant control proposal system according to claim 1, wherein the at least one processor further corrects the proposed control content depending on performance or a configuration of a control target related to the proposed control content.

10. A plant control proposal method, performed by at least one processor, the method comprising:

acquiring state information regarding a state of a plant;

acquiring, during operation of the plant, attribute information of a plurality of operators of the plant;

generating, as proposed control content, a control content depending on the state of the plant and an operator during operation of the plant based on the state information and the attribute information of the operator by using a control model that has been trained on a relationship between control content for controlling the plant and a control result obtained by executing control based on the control content on the plant, wherein the proposed control content is generated for each operator during operation of the plant based on the respective attribute information of each operator; and outputting the proposed control content.

11. A non-transitory program storage medium that stores one or more instructions that, when executed by at least one processor, cause the at least one processor to perform operations comprising:

acquiring state information regarding a state of a plant, acquiring, during operation of the plant, attribute information of a plurality of operators of the plant, generating, as proposed control content, a control content depending on the state of the plant and an operator during operation of the plant based on the state information and the attribute information of the operator by using a control model that has been trained on a relationship between control content for controlling the plant and a control result obtained by executing control based on the control content on the plant, wherein the proposed control content is generated for each operator during operation of the plant based on the respective attribute information of each operator, and outputting the proposed control content.

* * * * *